United States Patent [19]
Matzner et al.

[11] Patent Number: 5,608,768
[45] Date of Patent: Mar. 4, 1997

[54] THREADED FUEL ROD END PLUGS AND RELATED METHOD

[75] Inventors: Bruce Matzner, San Jose, Calif.;
Thomas G. Dunlap, Wilmington, N.C.;
Richard A. Proebstle, San Jose, Calif.

[73] Assignee: General Electric Company, Schenectady, N.Y.

[21] Appl. No.: 373,373

[22] Filed: Jan. 17, 1995

[51] Int. Cl.$^6$ ........................................... G21C 3/10
[52] U.S. Cl. .......................... 376/451; 376/440; 376/446; 376/443
[58] Field of Search ...................... 376/451, 440, 376/446, 443; 976/DIG. 65, DIG. 176

[56] References Cited

U.S. PATENT DOCUMENTS

| | | | |
|---|---|---|---|
| 3,679,545 | 7/1972 | Leirvik | 376/451 |
| 3,802,995 | 4/1974 | Fritz et al. | 376/435 |
| 3,864,211 | 2/1975 | King et al. | 376/440 |
| 4,022,661 | 5/1977 | Smith et al. | 376/440 |
| 4,089,742 | 5/1978 | Amaral et al. | 376/440 |
| 4,357,298 | 11/1982 | Wolters, Jr. et al. | 376/441 |
| 4,420,458 | 12/1983 | Dunlap et al. | 376/447 |
| 4,492,668 | 1/1985 | Pilgrim, Jr. et al. | 376/440 |
| 4,599,213 | 7/1986 | Leclercq et al. | 376/446 |
| 4,675,154 | 6/1987 | Nelson et al. | 376/444 |
| 4,684,501 | 8/1987 | Lui | 376/446 |
| 4,997,621 | 3/1991 | Johansson et al. | 376/444 |
| 5,017,332 | 5/1991 | Dix et al. | 376/370 |
| 5,112,570 | 5/1992 | Dix et al. | 376/370 |
| 5,141,711 | 8/1992 | Gjertsen et al. | 376/327 |

FOREIGN PATENT DOCUMENTS

| | | |
|---|---|---|
| 0048343 | 3/1982 | European Pat. Off. . |
| 0523540A1 | 1/1992 | European Pat. Off. . |
| 2209172 | 6/1974 | France . |
| 9210304 | 12/1992 | Germany . |

*Primary Examiner*—Charles T. Jordan
*Assistant Examiner*—Meena Chelliah
*Attorney, Agent, or Firm*—Nixon & Vanderhye P.C.

[57] ABSTRACT

In a fuel bundle assembly for a nuclear reactor wherein a plurality of fuel rods and tie rods extend between upper and lower tie plates and wherein some of the fuel rods are partial length fuel rods extending between the lower tie plate and a spacer located between the upper and lower tie plates, an improved end plug is provided for at least each of the partial length fuel rods, each end plug secured between a respective partial length fuel rod and the lower tie plate. The end plug includes an upper portion constructed of a first alloy material and including an exterior fuel rod receiving surface and a tapped hole in a lower end thereof, and a lower portion constructed of a second alloy material and including upper and lower threaded sections, the upper threaded section receivable within the tapped hole and the lower threaded section receivable within a tapped hole in the lower tie plate. The threaded end plug may be used with full length fuel rods as well as bundle tie rods. A related method of removing the fuel rod with the improved end plug from the lower tie plate is also disclosed.

20 Claims, 4 Drawing Sheets

THREADED FUEL ROD END PLUGS AND RELATED METHOD

TECHNICAL FIELD

This invention relates generally to nuclear reactors, and particularly to the manner in which certain fuel rods in a fuel bundle are secured to a lower tie plate assembly.

BACKGROUND

Typical fuel bundle assemblies in boiling water nuclear reactors include a plurality of elongated fuel rods supported between upper and lower tie plates. The fuel rods pass through a plurality of fuel rod spacers which provide intermediate support to retain the elongated rods in spaced relation and to restrain the rods from lateral vibration.

Each of the fuel rods comprises an elongated tube containing the fissile fuel (such as uranium or plutonium dioxide) in the form of pellets, particles, powder or the like, sealed in the tube by upper and lower end plugs. Most of the lower end plugs are formed with a taper for registration and support within cavities formed in the lower tie plate, while corresponding upper end plugs are formed with extensions which register with support cavities formed in the upper tie plate. These full length rods are spring biased towards the lower tie plate so as to prevent undesirable axial movement of the rods. It would be desirable to eliminate or reduce the number of parts associated with the upper tie plate while at the same time eliminating concerns about coolant flow impact on the conventional protruding lower tie plate end plugs.

Each fuel bundle assembly in current designs also contains several fuel rods which have threaded lower end plugs. These would typically include eight tie rods and as many as fourteen partial length fuel rods (PLR's) which terminate short of the upper tie plate. Fuel bundles with PLR's are disclosed, for example, in commonly owned U.S. Pat. Nos. 5,112,570 and 5,017,332. Fuel bundles including fuel rods serving as tie rods with threaded upper and lower end plugs are disclosed, for example, in commonly owned U.S. Pat. Nos. 4,357,298 and 4,420,458. After irradiation, it has been found that many of the threaded rods are not removable without extreme measures which are time consuming and which can damage the rods beyond repair. The apparent cause of the problem is that the lower end plugs of the rods stick in the lower tie plate as the result of corrosion which occurs on the male threads of the Zircaloy end plugs. It will be appreciated that increasing the number of fuel rods which are threadably connected to the lower tie plate will increase the chances of experiencing fuel rod sticking. Thus, there is a need for a simple and cost effective means for minimizing or eliminating the problem.

DISCLOSURE OF THE INVENTION

It is one object of this invention to eliminate the biasing springs in the upper tie plate normally used to bias non-threaded full length fuel rods toward the lower tie plate. This objective is achieved by utilizing a threaded end plug with all of the full length fuel rods.

This invention has for another object the solution of the fuel rod sticking problem described hereinabove. In the exemplary embodiment, the invention comprises replacing the integral threaded Zircaloy end plug shank with a stainless steel connecting shank which is threaded at opposite ends thereof. The stainless steel shank can thus be threaded into a tapped hole in the Zircaloy end plug body at one end, while the other end is threaded into a hole in the lower tie plate.

It is an additional feature of this invention that the opposite ends of the connecting shank can be threaded in opposite directions, i.e., one end is formed with a right-hand thread while the other is formed with a left-hand thread. With this arrangement, when torque is applied which loosens the connecting shank in the tie plate, the shank attachment to the end plug body is tightened. Conversely, when torque is applied which tightens the connecting shank in the tie plate, the shank attachment to the end plug body is loosened. Thus, when removing the fuel rod, the stainless steel connecting shank can either remain in the lower tie plate, or remain in the Zircaloy end plug body and thus be removed with the fuel rod. This capability provides a further option in the event threads are frozen in one of the two threading directions.

Thus, in its broader aspects, the present invention relates to an end plug for a fuel rod of a nuclear reactor fuel bundle assembly including upper and lower tie plates, the end plug comprising an upper portion constructed of a first alloy material and including an exterior fuel rod receiving surface and a tapped hole in a lower end thereof; and a removable lower portion constructed of a second alloy material and including upper and lower threaded sections, the upper threaded section receivable within the tapped hole and the lower threaded section receivable within a correspondingly threaded hole in the lower tie plate.

In another aspect, the invention relates to a fuel bundle assembly for a nuclear reactor having a plurality of fuel rods including a plurality of full length fuel rods extending between upper and lower tie plates and at least one partial length fuel rod extending between the lower tie plate and a spacer located between the upper and lower tie plates, the improvement comprising an end plug for at least the partial length fuel rod, the end plug secured between the partial length fuel rod and the lower tie plate, the end plug comprising an upper portion constructed of a first alloy material and including an exterior partial length fuel rod receiving surface and a tapped hole in a lower end thereof; and a lower portion constructed of a second alloy material and including upper and lower threaded sections, the upper threaded section receivable within the tapped hole and the lower threaded section receivable within a tapped hole in the lower tie plate.

In still another aspect, the invention relates to a method of removing a fuel rod from a fuel rod bundle assembly in a nuclear reactor, wherein the fuel rod bundle assembly includes a plurality of fuel rods extending between upper and lower tie plates, the method comprising the steps of:

a) providing an end plug for a lower end of at least one of the fuel rods comprising an upper portion constructed of a first alloy material and including an exterior fuel rod receiving surface and a tapped hole in a lower end thereof; and a lower portion constructed of a second alloy material and including upper and lower threaded sections, the upper threaded section receivable within the tapped hole and the lower threaded section receivable within a correspondingly threaded hole in the lower tie plate; and b) rotating the fuel rod in a first direction to separate the fuel rod and the fuel rod end plug from the tie plate.

An optional method step is available if the upper and lower sections of the end plug lower portion are threaded in opposite directions. This construction permits rotating the first rod in a second opposite direction to separate the fuel

BEST MODE FOR CARRYING OUT THE INVENTION

Figure 1:
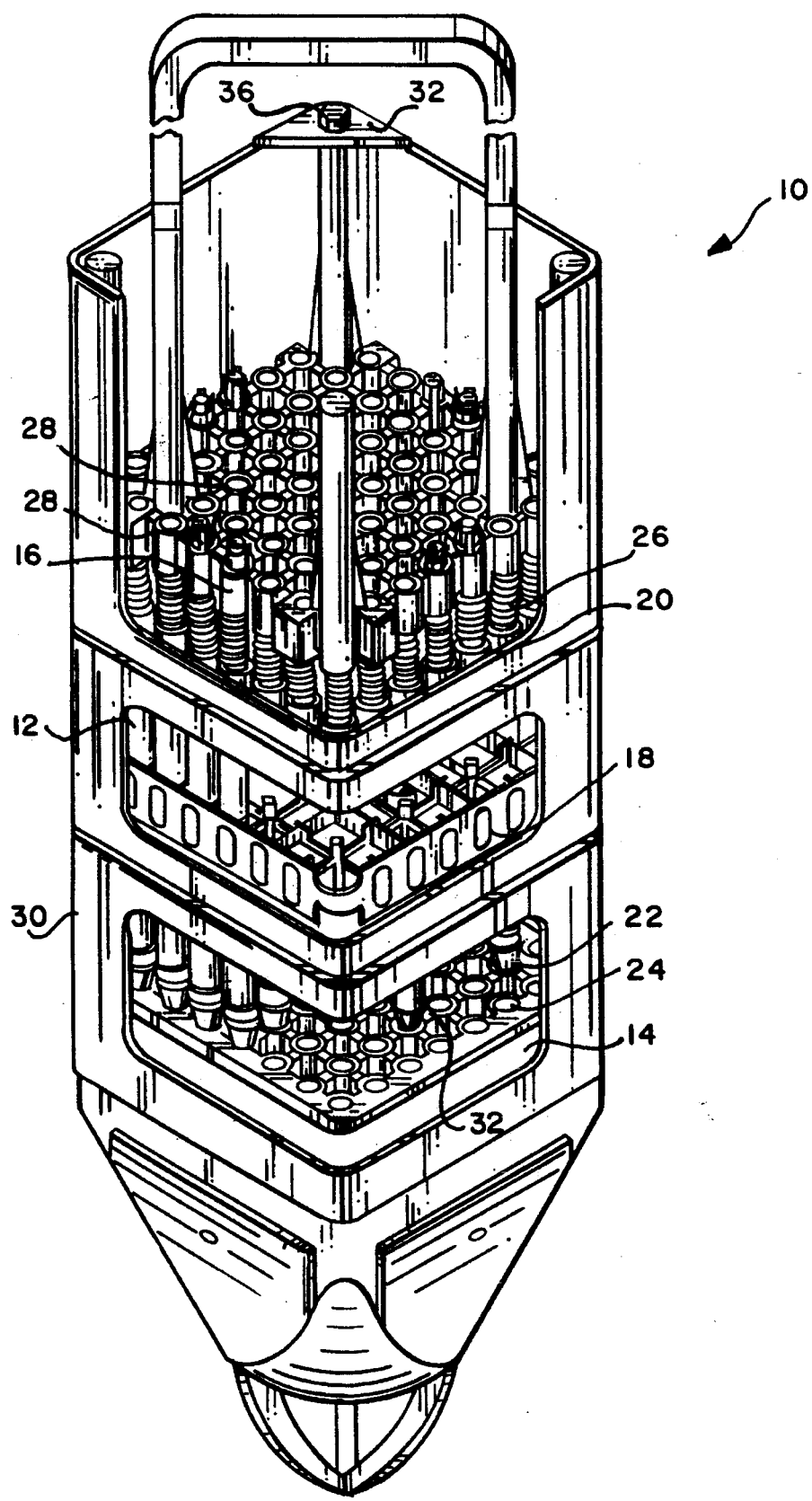
FIG. 1 is a perspective view, partially cut away to show details of a fuel bundle with which the present invention may be employed.

With reference to FIG. 1, a conventional fuel assembly 10 includes a plurality of elongated, full length fuel rods (FLR's) 12 supported between a lower tie plate 14 and an upper tie plate 16. Fuel rods 12 pass through a plurality of fuel rod spacers 18 which provide intermediate support to retain the elongated rods in spaced relation and to restrain them from lateral vibration.

Each fuel rod 12 comprises an elongated tube containing the fissile fuel (such as uranium or plutonium dioxide) in the form of pellets, particles, powder or the like, sealed in the tube by upper and lower end plugs 20 and 22. Lower end plugs 22 are formed with a taper for registration and support in support cavities 24 formed in the lower tie plate 14. Upper end plugs 20 are formed with extensions 26 which register with support cavities 28 in the upper tie plate 16. A channel 30 encloses the bundle in the usual manner.

Several of the support cavities 24 in the lower tie plate 14 are formed with threads to receive tie fuel rods or PLR's (one shown at 32 in FIG. 1). As already mentioned hereinabove, there are typically eight tie rods and as many as fourteen PLR's in current fuel bundle designs which are attached to the lower tie plate by threaded holes and threaded end plug shanks. These rods typically terminate adjacent one of the spacers 18 as shown in FIG. 1.

Figure 2:
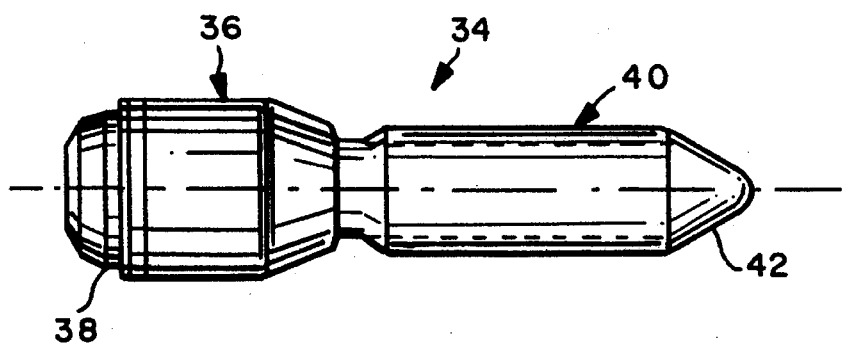
FIG. 2 is a side elevation of a conventional fuel rod end plug.
Figure 3:
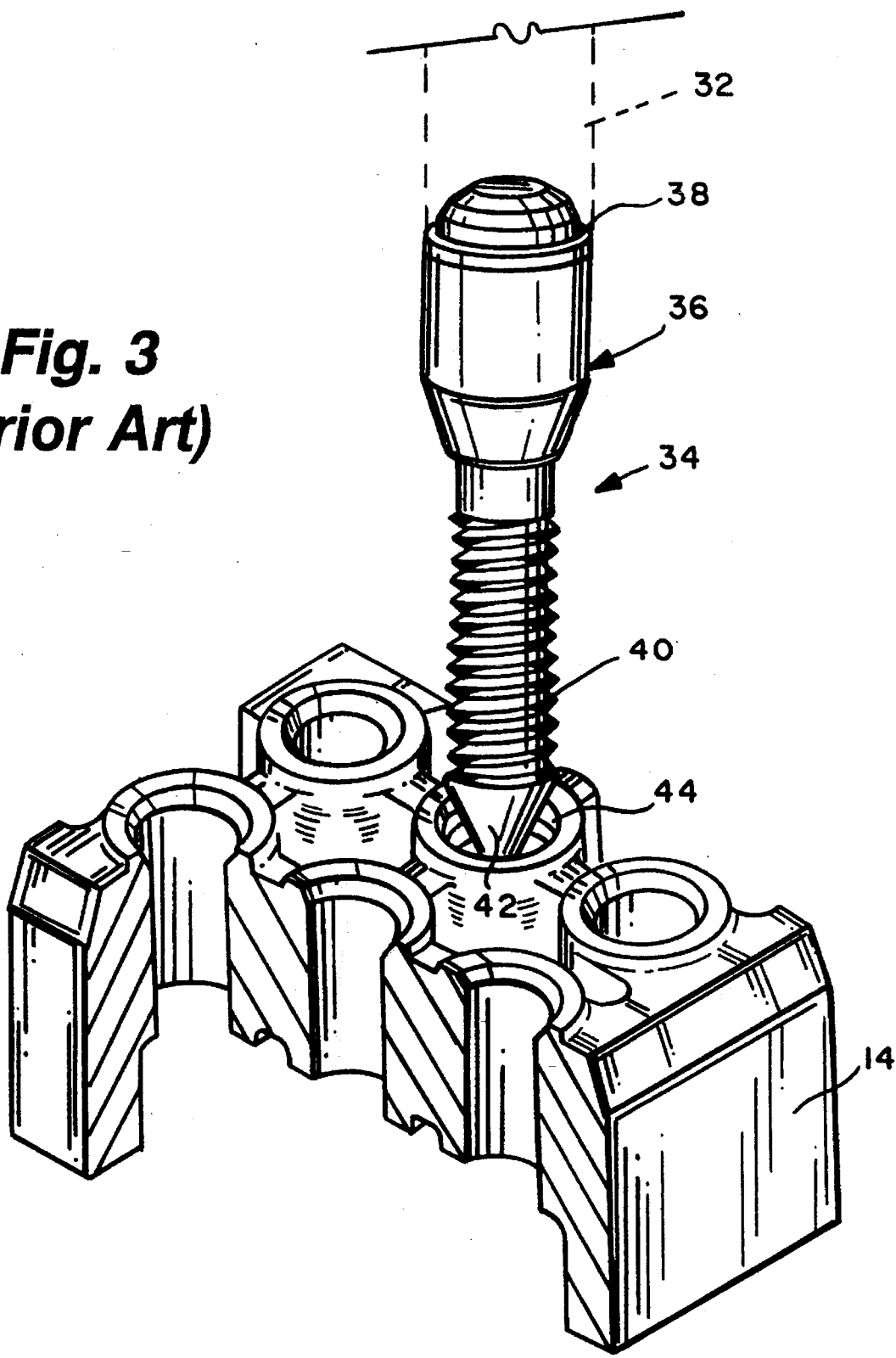
FIG. 3 is a perspective fragmentary view of a lower tie plate and an associated conventional end plug of the type shown in FIG. 2.

FIG. 2 illustrates a conventional end plug 34 of the type used with, for example, the PLR 32 shown in FIG. 1. The end plug 34, is formed of Zircaloy and includes a generally cylindrical upper body portion 36, including an annular fuel rod support shoulder 38 (the first rod is typically welded to the end plug), and a lower threaded portion 40 including a tapered lower end 42. This one piece end plug is adapted to be received in a threaded hole 44 formed in the lower tie plate 14. This conventional arrangement is illustrated in FIG. 3.

It has been experienced that, after irradiation, many of the rods threaded into the lower tie plate 14 are difficult to remove. It has been determined that the cause of the binding or sticking of fuel rods within the lower tie plate is related to the corrosion which occurs on the male threads at the lower end 40 of the Zircaloy end plug 34. More specifically, the corrosion process creates a zirconium oxide with a net volume increase relative to the original volume of Zircaloy, and this excess material creates locking forces between the male end plug threads on the lower end 40 of the end plug, and the female threads in the hole 44 in the lower tie plate 14. Since the lower tie plate 14 is made of stainless steel (a harder and more corrosion resistant material than Zircaloy which does not experience any significant corrosion in the BWR environment), it has also been determined that the lower tie plate per se does not contribute to the locking problem.

Figure 4:
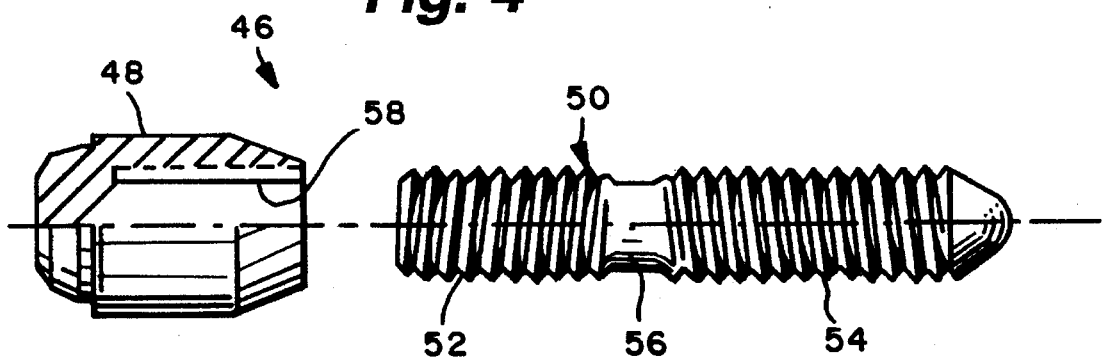
FIG. 4 is an exploded side elevation, partly in section, of a fuel rod end plug incorporating a double threaded connecting shank in accordance with this invention.
Figure 5:
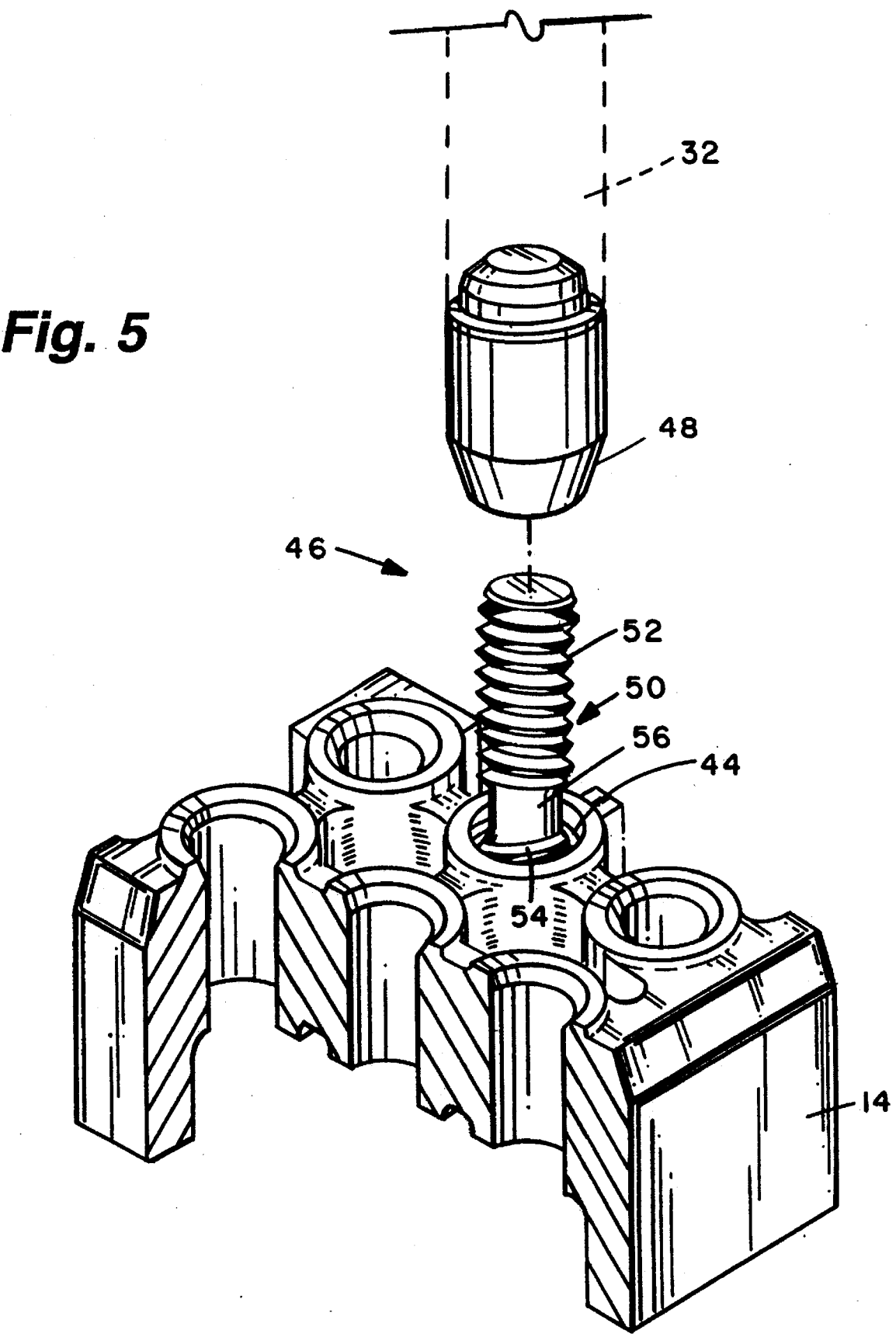
FIG. 5 is a perspective fragmentary view similar to FIG. 3 but with the fuel rod end plug in accordance with this invention.

The invention here, and as best seen in FIG. 4, relates to a new Zircaloy end plug 46 which includes an upper body portion 48 which is similar to the upper body portion 36 of the conventional end plug 34, and a lower portion which includes a removable stainless steel connecting shank 50. The shank 50 is threaded at an upper section 52 and at a lower section 54 with a smooth intermediate portion 56 connecting the threaded sections. The upper threaded section 52 is receivable within a tapped hole 58 formed in the now axially shortened Zircaloy end plug upper body portion 48, and the lower threaded section 54 of the connecting shank 50 is adapted to be threaded directly into the correspondingly threaded hole 44 in the lower tie plate 14 as best seen in FIG. 5.

In the preferred embodiment, the sections 52 and 54 of the stainless steel connecting shank 50 are threaded in opposite directions. At the same time, the tapped holes 44 and 58 in both the lower tie plate 14 and the Zircaloy end plug upper body portion 48, respectively, are correspondingly threaded. With this arrangement, when the fuel rod 32 (for example) is removed from the lower tie plate 14, both the end plug upper body portion 48 and end plug lower portion, i.e., the connecting shank 50, can be removed with the fuel rod 30, or the connecting shaft 50 can be left within the lower tie plate 14, depending on the direction of rotation of the fuel rod 32 relative to the end plug 46. In other words, if it is desired to maintain the stainless steel connecting shank 50 in the lower tie plate 14, then the fuel rod may be turned in, for example, a clockwise direction, thereby separating the fuel rod 30 and the end plug upper body portion 48 from the upper threaded section 52 of the shank 50, such that shank 50 remains in the lower tie plate 14. On the other hand, if it is desired to maintain the connecting shank 50 within the end plug upper body portion 48, then the fuel rod 30 is rotated in an opposite direction so that the fuel rod 32 and the entire end plug 46 including the upper connecting shank 50 are removed together from the lower tie plate 14.

The above arrangement also provides an additional option in the event of any sticking problem which may be experienced when attempting to remove the fuel rod. In other words, if the threads on shank 50 are frozen in one direction of rotation of fuel rod 32, an option remains by virtue of being able to rotate the fuel rod in the opposite direction so that the fuel rod can be removed, with or without the shank 50.

It is also a feature of this invention that if a concern exists relative to debris or dirt clogging an open threaded hole (e.g., hole 44) in the lower tie plate 14 during fuel bundle reconstitution work, then the stainless steel connector shank 50 can be left in the lower tie plate 14 rather than in the end plug body 48, thereby precluding dirt or debris from entering the lower tie plate 14.

In the preferred embodiment, and as already noted above, the connecting shank 50 is preferably constructed of stainless steel but in any event, in order to minimize if not completely eliminate the corrosion and sticking problem discussed herein, the connecting shank material should be harder, stronger and more corrosion resistant than the Zircaloy end plug body material.

Under certain conditions, it might be advantageous to favor one fuel rod removal technique over another and this can be facilitated by incorporating differential torque characteristics at opposite threaded ends of the connector shank 50. In addition, while the invention has been described above in connection with partial length fuel rods, it will be appreciated that the utilization of a connector shank 50 of the type disclosed herein may also be used with fuel bundle tie rods as well as full length fuel rods where appropriate.

It will also be appreciated that the threaded end plugs 46 of this invention may be utilized not only with PLR's but with tie rods and FLR's as well. By utilizing threaded end plugs as disclosed herein for the FLR's, it will be appreciated that the biasing springs conventionally used to bias FLR's into the lower tie plate holes (utilizing non-threaded fuel rod end plugs) can be eliminated. Utilizing threaded end plugs to secure fuel rods within the lower tie plate also eliminates the need for conventional end plugs which protrude through the lower tie plate, and thus removes or eliminates concern for coolant flow impact resulting from such protruding end plugs.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An end plug for a fuel rod of a nuclear reactor fuel bundle assembly including upper and lower tie plates, the end plug comprising:

an upper portion constructed of a first alloy material and including an exterior fuel rod receiving surface and a rapped hole in a lower end thereof; and a removable lower portion constructed of a second alloy material and including upper and lower threaded sections, said upper threaded section receivable within said tapped hole and said lower threaded section receivable within a correspondingly threaded hole in the lower tie plate.

2. The end plug of claim 1 wherein said first alloy material is Zircaloy.

3. The end plug of claim 1 wherein said second alloy material is stainless steel.

4. The end plug of claim 2 wherein said second alloy material is stainless steel.

5. The end plug of claim 1 wherein said second material is harder than said first material.

6. The end plug of claim 1 wherein said upper and lower threaded sections are threaded in opposite directions.

7. In a fuel bundle assembly for a nuclear reactor having a plurality of fuel rods including a plurality of full length fuel rods extending between upper and lower tie plates and at least one partial length fuel rod extending between the lower tie plate and a spacer located between said upper and lower tie plates, the improvement comprising an end plug for at least said partial length fuel rod, said end plug secured between said partial length fuel rod and said lower tie plate, said end plug comprising:

an upper portion constructed of a first alloy material and including an exterior partial length fuel rod receiving surface and a tapped hole in a lower end thereof; and a lower portion constructed of a second alloy material and including upper and lower threaded sections, said upper threaded section receivable within said tapped hole and said lower threaded section receivable within a tapped hole in the lower tie plate.

8. The fuel bundle assembly of claim 7 wherein said first alloy material is Zircaloy.

9. The fuel bundle assembly of claim 7 wherein said second alloy material is stainless steel.

10. The fuel bundle assembly of claim 8 wherein said second alloy material is stainless steel.

11. The fuel bundle assembly of claim 7 wherein said second material is harder than said first material.

12. The fuel bundle assembly of claim 7 wherein said upper and lower threaded sections are threaded in opposite directions.

13. The fuel bundle assembly of claim 7 wherein respective ones of said end plugs are provided for said plurality of full length rods.

14. A method for removing a fuel rod from a fuel rod bundle assembly in a nuclear reactor, wherein the fuel rod bundle assembly includes a plurality of fuel rods including full length fuel rods extending between upper and lower tie plates and at least one partial length fuel rod extending upwardly from said lower tie plate, the method comprising the steps of:

a) providing an end plug for a lower end of said at least one partial length fuel rod comprising an upper portion constructed of a first alloy material and including an exterior fuel rod receiving surface and a tapped hole in a lower end thereof; and a lower portion constructed of a second alloy material and including upper and lower threaded sections, said upper threaded section receivable within said tapped hole and said lower threaded section receivable within a correspondingly threaded hole in the lower tie plate;

b) rotating the fuel rod in a first direction to separate said fuel rod and the fuel rod end plug from the lower tie plate.

15. The method of claim 14 wherein said upper and lower sections are threaded in opposite directions and wherein the method comprises an optional step of rotating the fuel rod in a second opposite direction to separate the fuel rod and the upper portion of the end plug from the lower portion of the end plug, leaving the latter in the lower tie plate.

16. The method of claim 14 wherein said first alloy material is Zircaloy.

17. The method of claim 14 wherein said second alloy material is stainless steel.

18. The method of claim 16 wherein said second alloy material is stainless steel.

19. The method of claim 14 wherein said second material is harder than said first material.

20. The method of claim 14 and including providing a respective one of said end plugs for each of said full length fuel rods.

\* \* \* \* \*